US008510153B2

(12) United States Patent
Dodge et al.

(10) Patent No.: US 8,510,153 B2
(45) Date of Patent: *Aug. 13, 2013

(54) HUMAN SERVICE PROVIDER RELATIONSHIP MANAGEMENT FOR GOVERNMENT AGENCIES

(75) Inventors: Andrea Lynne Dodge, Jamaica Plain, MA (US); Carl S. Kiefer, Cromwell, CT (US); William Kilmartin, Wakefield, MA (US); Henry M. Hsu, Jersey City, NJ (US)

(73) Assignee: Accenture Global Services Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 13/417,479

(22) Filed: Mar. 12, 2012

(65) Prior Publication Data
US 2012/0173452 A1    Jul. 5, 2012

Related U.S. Application Data

(63) Continuation of application No. 10/807,031, filed on Mar. 23, 2004, now Pat. No. 8,175,912.

(60) Provisional application No. 60/459,290, filed on Apr. 1, 2003.

(51) Int. Cl.
*G06Q 10/00* (2012.01)
(52) U.S. Cl.
USPC ........ 705/7.41; 705/52; 705/7.37; 705/14.52; 707/608
(58) Field of Classification Search
USPC ................................................. 705/1.1, 7.41
See application file for complete search history.

(56) References Cited

U.S. PATENT DOCUMENTS

| 4,799,156 | A  |   | 1/1989  | Shavit et al. |
|-----------|----|---|---------|---------------|
| 5,563,991 | A  | * | 10/1996 | Mahoney ............... 382/113 |
| 6,031,547 | A  | * | 2/2000  | Kennedy ............... 345/440 |
| 6,326,962 | B1 |   | 12/2001 | Szabo |
| 6,381,587 | B1 | * | 4/2002  | Guzelsu ............... 705/40 |
| 6,556,659 | B1 |   | 4/2003  | Bowman |
| 7,315,826 | B1 |   | 1/2008  | Guheen et al. |
| 2002/0046081 | A1 |  | 4/2002  | Albazz et al. |
| 2002/0138449 | A1 |  | 9/2002  | Kendall et al. |
| 2002/0165855 | A1 |  | 11/2002 | Ohtomo |

OTHER PUBLICATIONS

Canadian Office Action for Application No. 2,520,473 dated Aug. 23, 2010 (7 pages).

(Continued)

*Primary Examiner* — Jami A Plucinski
*Assistant Examiner* — Fathi Abdelsalam
(74) *Attorney, Agent, or Firm* — Fish & Richardson P.C.

(57) ABSTRACT

A system includes a central server in communication with public agencies through a private network and with local service-providers through a public network. The central server executes a profiling module configured to exchange standardized information with a local service-provider over the public network and with a public agency over the private network; an invoicing module in communication with the profiling module, the invoicing module being configured to process claims submitted by the local service-providers; a compliance module in communication with the profiling module, the compliance module being configured to monitor compliance with contracts between the local service-providers and the public agencies; a demand module in communication with the profiling module for forecasting demand for services; and a procurement module in communication with the profiling module for entering into contracts with the local service-providers.

19 Claims, 12 Drawing Sheets

(56) References Cited

OTHER PUBLICATIONS

InFormandNETFramewrk.pdf—downloaded Aug. 23, 2004, (http://www.qualifacts.com/Downloads/inFormandNETFramewrk.pdf).
Title: SLA management in federated environments. Author(s): Bhoj, P. 1; Singhal, S.; Chutani, S. Journal: Computer Networks, vol.35, No. 1, pp. 5-24. Publisher: Elsevier. Country of Publication: Netherlands. Publication Date: Jan. 2001.
U.S. Notice of Allowance for U.S. Appl. No. 10/807,031 mailed Aug. 4, 2011, 44 pages.
U.S. Notice of Allowance for U.S. Appl. No. 10/807,031 mailed Dec. 12, 2011, 34 pages.
U.S. Final Office Action for U.S. Appl. No. 10/807,031 dated Aug. 3, 2009, 32 pages.
U.S. Final Office Action for U.S. Appl. No. 10/807,031 dated Jul. 22, 2010, 33 pages.
U.S. Non-Final Office Action for U.S. Appl. No. 10/807,031 dated Feb. 6, 2009, 33 pages.
U.S. Non-Final Office Action for U.S. Appl. No. 10/807,031 dated Jan. 21, 2010, 33 pages.
Canadian Office Action for Application No. 2,520,473 dated Apr. 18, 2012, 5 pages.

* cited by examiner

|   | DMH | DMR | DPH | DSS | DYS | OCCS |
|---|---|---|---|---|---|---|
| DMR | $514 / 50% | | | | | |
| DPH | $294 / 49% | $250 / 27% | | | | |
| DSS | $455 / 67% | $433 / 44% | $200 / 35% | | | |
| DYS | $105 / 24% | $58 / 8% | $50 / 15% | $175 / 44% | | |
| OCCS | $84 / 12% | $73 / 7% | $193 / 32% | $11 / 17% | $13 / 3% | |

|   | DMH | DMR | DPH | DSS | DYS | OCCS |
|---|---|---|---|---|---|---|
| DMR | 66 | | | | | |
| DPH | 64 | 60 | | | | |
| DSS | 97 | 84 | 118 | | | |
| DYS | 20 | 11 | 13 | 33 | | |
| OCCS | 21 | 24 | 71 | 85 | 4 | |

Table 100C:

| | DMR | DPH | DSS | DYS | OCCS |
|---|---|---|---|---|---|
| DMH | $514 | $294 | $455 | $105 | $84 |
| DMR | | $250 | $433 | $58 | $73 |
| DPH | | | $200 | $50 | $193 |
| DSS | | | | $175 | $114 |
| DYS | | | | | $13 |

Table 106:

| DMH: Largest Programs Purchased from 97 Shared Service-Providers | | DSS: Largest Programs Purchased from 97 Shared Service-Providers | |
|---|---|---|---|
| Adult Residential Services | $126.7 | Residential Service | $59.0 |
| Child/Adolescent Residential Service | $21.0 | Commonworks | $54.8 |
| Community Rehab. Support | $17.0 | Contracted Foster Care | $17.3 |
| Comprehensive Psychiatric Services | $16.6 | Foster Care | $17.2 |
| Individual Support (Blanket) | $12.7 | Family Based Service | $13.0 |
| Intensive Residential Treatment | $12.4 | Group Home | $10.0 |
| Clubhouse Services | $8.1 | Residential Shelter | $3.9 |
| Child/Adolescent Contracted In | $7.4 | Family Based Services Lead | $2.6 |
| Day Rehabilitation | $6.2 | Clinical Family Based Service | $2.1 |
| Day Services | $4.6 | Residential Treatment Centers | $1.7 |

FIG. 9

HUMAN SERVICE PROVIDER RELATIONSHIP MANAGEMENT FOR GOVERNMENT AGENCIES

CROSS-REFERENCE TO RELATED APPLICATIONS

This application is a continuation (and claims the benefit of priority under 35 USC 120) of U.S. application Ser. No. 10/807,031, filed Mar. 23, 2004, now allowed, which claims the benefit to U.S. Provisional Application No. 60/459,290 filed Apr. 1, 2003, titled HUMAN SERVICE PROVIDER RELATIONSHIP MANAGEMENT FOR GOVERNMENT AGENCIES. Both of these prior applications are incorporated by reference in their entirety.

FIELD OF INVENTION

This invention relates to relationship-management systems.

BACKGROUND

Historically, those in need of human services were forced to rely upon private charities, religious organizations, philanthropists, and the munificence of the general population. The delivery of human services was thus a thoroughly decentralized operation carried out by private sector organizations that rarely collaborated with one another.

The shortcomings of complete reliance on the private sector became increasingly apparent by the early decades of the twentieth century. In response, the state governments undertook ambitious programs to administer the delivery of human services. Examples of such services include primary health care, substance abuse services, therapeutic childcare, and vocational rehabilitation programs. Today, the provision of human services is one of the most significant activities of the state government.

The vast majority of direct care and services are provided using taxpayers dollars that are contracted out from state and local government agencies to non-governmental, typically non-profit, organizations. Public employees render only a fraction of the human services delivered in a state. The state government's role is to provide funding and oversight of non-governmental organizations, entering into contractual relationships with local service-providers and to effectively manage those relationships.

A difficulty associated with the use of local service-providers is the need to manage the multitude of relationships that develop between the state's various agencies and the local service-providers. Managing these relationships includes, for example, selecting and entering into contracts with the local service-providers, ensuring that the terms of the contract are being complied with, ensuring that any reporting requirements are being met, handling invoicing on a timely basis, and conducting accurate audits of provider accounts and activities.

Nominally, a single entity, namely the state, is charged with managing the delivery of human services. As such, one would expect that the delivery of human services is no longer the chaotic and decentralized operation that it once was. One would expect that with a single entity assuming the entire management role, the entire delivery of human services would have become a highly centralized and efficient operation.

In practice, a state government includes many autonomous agencies that may not communicate with each other. These agencies may be large enough so that individual managers within those agencies likewise do not communicate with each other. As a result, different agencies will often contract with the same local service-provider without knowing it. In some cases, the same agency will maintain several contracts with the same local service-provider without knowing it. This arrangement breeds inefficiency by creating circumstances in which particular relationship management tasks are performed multiple times.

As an example, a first agency entering into a first contract with a local service-provider may require evidence of accreditation or licensing of that local service-provider. A second agency, which may be the same agency as the first agency, may then enter into a second contract with that local service-provider. While each agency may have legitimately different licensure or accreditation requirements, the local service-provider communicates separately and redundantly with both agencies. This separate and redundant communication also exists for other aspects of the relationships between the agencies and the local service-provider including, for example, contact management, invoicing and payment, and service reporting aspects of the relationships.

In another example, a first agency may enter into a first contract with a local service-provider to provide services at a first price. A second agency, unaware of the first contract, may enter into a second contract for the identical services at a higher price. In this case, because of its ignorance of the first contract, the second agency will have spent more than necessary to obtain the same services as the first agency.

In yet another example, a first agency may enter into a contract with a local service-provider without knowing that the same local service-provider delivered sub-standard services to a second agency. In this case, the first agency will either compromise its delivery of services or miss out on the opportunity to use the local service-provider's earlier performance to negotiate a better price from that local service-provider.

SUMMARY

A system according to the invention provides centralized management of relationships between government agencies (i.e., public agencies) and local service-providers. Such a system includes, in one aspect, a central server in communication with public agencies through a private network and with local service-providers through a public network. The central server executes a profiling module configured to exchange standardized information with a local service-provider over the public network and with a public agency over the private network; an invoicing module in communication with the profiling module, the invoicing module being configured to process claims submitted by the local service-providers; a compliance module in communication with the profiling module, the compliance module being configured to monitor compliance with contracts between the local service-providers and the public agencies; a demand module in communication with the profiling module for forecasting demand for services; and a procurement module in communication with the profiling module for entering into contracts with the local service-providers.

In some embodiments, the compliance module is configured to monitor compliance based primarily on inputs from the invoicing module. In other embodiments, the demand module is configured to forecast demand based primarily on inputs from the compliance module. In other embodiments, the procurement module is configured to determine costs associated with the contracts based primarily on inputs from the demand module.

In some embodiments, at least one of the claims submitted by the local service-providers refers to contracted services delivered to a consumer. The invoicing module is configured to execute a rules engine to validate the claims based on contract information and information associated with the consumer.

In some embodiments, the procurement module is further configured to identify services according to a classification system for the services. The classification system includes classification according to a purpose of services and classification according to levels of care.

In some embodiments, the profiling module associates the standardized information with categories for interpreting the standardized information. The categories include at least one of a type of service, a type of consumer, a type of facility, an amount paid, or a unit of service. A type of service category can be configured to include at least two types of childcare, transportation, or psychiatric examination. A unit of service category can be configured to include at least two units of a residential bed, a medical procedure, or an employment placement outcome.

In another aspect, the invention features a method that includes accepting utilization information characterizing costs associated with services purchased by a plurality of agencies from a plurality of service-providers. The method also includes, on the basis of the utilization information, generating overlap statistics characterizing services purchased by different agencies from a common service-provider, and generating a graphical representation of the overlap statistics.

In some embodiments, generating the graphical representation includes rendering a first graphical element identifying a first agency of the plurality of agencies, rendering a second graphical element identifying a second agency of the plurality of agencies, and rendering an intersection element corresponding to the first graphical element and the second graphical element. The intersection element includes a quantity representing services purchased by the first agency and services purchased by the second agency from a common service-provider.

In some embodiments, the first graphical element includes a heading of a row, the second graphical element includes a heading of a column, and the intersection element includes a cell corresponding to the row and the column.

In other embodiments, the first graphical element includes a first shape, the second graphical element includes a second shape, and the intersection element corresponds to an intersection of the first shape and the second shape. In some embodiments, the intersection element further corresponds to an intersection of the first shape and a third shape and an intersection of the second shape and the third shape, wherein the third shape identifies a third agency of the plurality of agencies.

In some embodiments, the graphical representation further includes a list including service-providers from whom services were purchased by both the first agency and the second agency, the list being associated with the intersection element.

In some embodiments, the graphical representation further includes a list including types of services purchased by the first agency from a service-provider from whom services were purchased by both the first agency and the second agency, the list being associated with the intersection element.

In another aspect, the invention features an article of manufacture having computer-readable program portions embodied therein, the article comprising instructions for causing a processor to perform any one or more of the above methods.

These and other features will be apparent from the following detailed description and the drawings, in which:

BRIEF DESCRIPTION OF THE FIGURES

FIGS. 6A and 6B and 7-11 are examples of graphical representations of overlap statistics.

DETAILED DESCRIPTION

Figure 1:
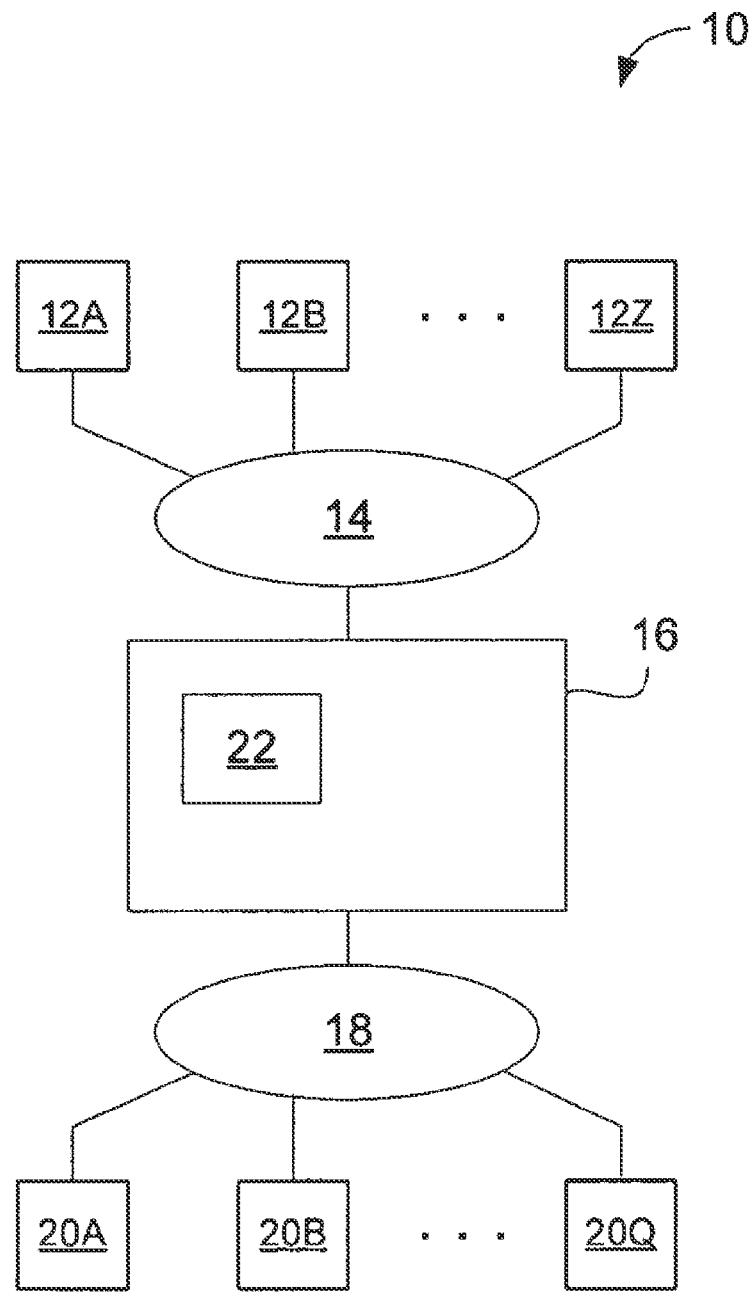
FIG. 1 is a relationship management system.

Referring to FIG. 1, a relationship-management system 10 incorporating the invention includes a plurality of agency servers 12A-Z, each of which is associated with a public agency. An agency may have more than one such agency server 12A-B. Alternatively, two or more agencies can share the same agency server 12C. Each agency server 12A-Z includes a network connection to a private computer-network 14 that is unavailable to the public.

A central server 16 is connected to both the private computer-network 14 and to a public computer-network 18 such as the internet. Local service-providers maintain service-provider servers 20A-Q that are also connected to the public computer-network 18. The central server 16 can thus communicate with both the service-provider servers 20A-Q, over the public computer-network 18, and with the agency servers 12A-Z, over the private computer-network 14. Consequently, the central server 16 is uniquely situated for centralized management of relationships between the state agencies and the local service-providers.

The central server 16 manages all back-office functions associated with the relationship-management process. These back-office functions include procurement, contracting, auditing, reporting, claims and payment processing, pricing and forecasting. The central server 16 also serves as collaboration hub for enabling public agencies seeking or managing similar services to jointly price, procure, and manage contracts those services.

Local-service providers deliver contracted services to families and individuals in local communities. During the procurement process, a typical local service-provider submits documents for review. Following the procurement process, the local service-provider submits claims for payments with documentation for services delivered to a consumer. Periodically, the local service-provider submits audit and reporting information to public agencies or to a government auditor having read access to all data in the relationship-management system 10.

Although the central server 16 is connected to a public computer-network 18, the public at large is barred from interaction with the central server 16. Each service-provider server 20A has access to the central server 16. However, a service-provider server 20A is excluded from access to data associated with other service-provided servers 20B-Q.

The central server 16 is configured to execute relationship-management software 22 for assisting agencies in managing their relationships with local service-providers. It does so by facilitating the collaboration of those agencies and the ability of those agencies to efficiently share information.

Figure 2:
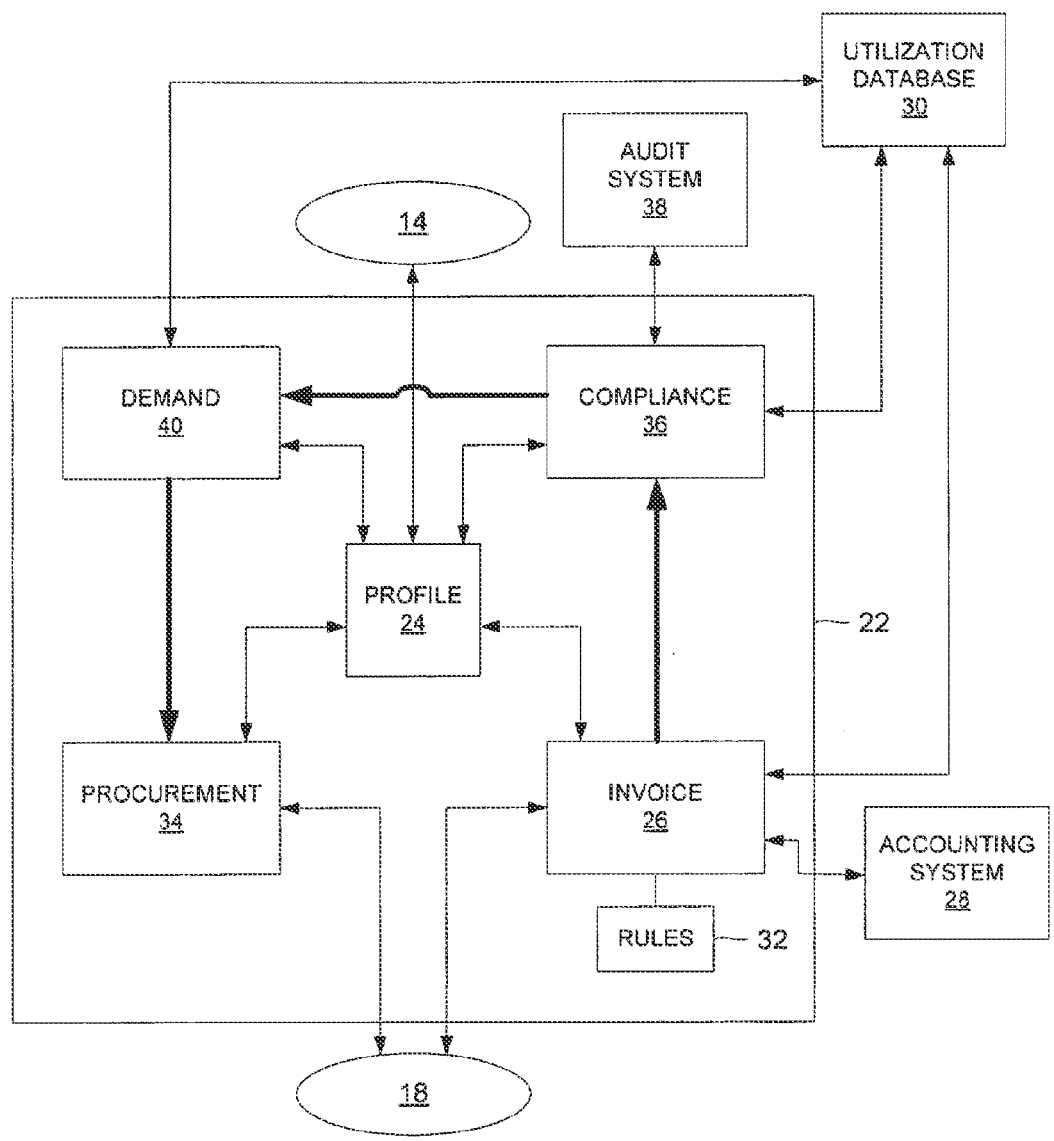
FIG. 2 is a block diagram showing the architecture of relationship management software executing on the central server of FIG. 1.

FIG. 2 shows, in more detail, the architecture of the relationship-management software 22 referred to in FIG. 1.

Since collaboration proceeds best when the collaborators speak the same language, the relationship-management software 22 includes a provider-profiling module 24 in communication with the public computer-network 18 and with the private computer-network 14. The profiling module 24 casts information to be exchanged between local service-providers and public agencies into the same format. Such information can include qualification documents, documents reflecting claim and payment activity, documents containing audit information, documents containing licensing or credentialing information, and documents that summarize the services rendered.

The standardized format used by the profiling module 24 includes associating stored information with categories (e.g., XML fields) for interpreting the information. Such categories can include, e.g., a type of service, a type of consumer, a type of facility, an amount paid, and/or a unit of service. This standardized format is designed to accommodate a range of disparate services. For example, a "type of service" category can be configured to include a combination of disparate types such as childcare, transportation, or psychiatric examination. A "unit of service" category can be configured to include a combination of disparate units such as a residential bed, a medical procedure, or an employment placement outcome.

The profiling module 24 communicates with an invoice module 26 that provides an interface with an external accounting system 28 and with a utilization database 30 containing information representative of rendered services. The invoice module 26 is configure to accept claims submitted by the service-provider servers 20A-Q over the public computer-network 18 and to execute a rules engine 32 for validation of those claims (e.g., based on information associated with a contract and information associated with a consumer of contracted services). The invoice module 26 also automatically updates the utilization database 30 and communicates claims information to the accounting system 28.

As shown in FIG. 2, the utilization database 30 is external to any of the five modules. However, the location of the utilization database 30 is unimportant. What is important is that selected modules be able to access the utilization database 30.

The profiling module 24 also communicates with a procurement module 34 that exchanges information with the service-provider servers 20A-Q over the public computer-network 18. Such information can include information for facilitating entry into a contract, for example requests for proposals, requests for quotes, and similar information generated by state agencies, responses from local service-providers to this information, and communication regarding the status of a proposal response or request. The procurement module 34 also enables exchange, between agency servers 12A-Z, of information related to selection of local service-providers and entering into contracts with those providers. Examples of information of this type include license and credential information, information on past performance of those local service-providers in other contracts with the same or different agencies, and information on costs charged by the local service-provider in other contracts.

The procurement module 34 identifies services according to a standard classification system for the services. For example, the standard classification system can classify services according to "purpose of services" (e.g., mental health services, services to promote or protect physical health, employment services, etc.). Services can be further classified according to "levels of care" (non-clinical to highly-clinical, and/or low cost to high cost). A standard classification system for services enables the agencies to identify services in a consistent way.

A compliance module 36 in communication with the profiling module 24, with the invoice module 26, and with the utilization database 30 provides a central repository for data on licenses and credentials of local service-providers and other information intended to ensure that the quality of services rendered by local service-providers is unlikely to fall below a minimum threshold. The compliance module 36 also maintains a risk-based audit system 38 that selects particular local service-providers for audit. Occasional poor performance of a local service-provider calls for a corrective action plan to remedy that poor performance. The compliance module 36 provides centralized management of such corrective action plans across public agencies served by agency servers 12A-Z.

The compliance module 36 provides performance data to a demand forecast and rate setting module 40 (hereafter referred to as the "demand module 40.") The demand module 40, which is in communication with both the profiling module 24, the procurement module 34, and the utilization database 30 is configured to forecast demand for services and to determine appropriate costs for those services. On the basis of data provided by the compliance module 36 and the utilization database 30, the demand module 40 synthesizes utilization data for predicting demand and uses that utilization data for budgeting. Data from the compliance module 36 also permits the demand module 40 to provide the procurement module 34 with appropriate costs to include in requests for proposals and requests for quotes delivered to local service-providers.

Agencies having agency servers 12A-Z in communication with the central server 16 are thus able to refer to the same corpus of data associated with the relationship management process. As a result, these agencies can more readily collaborate with each other, thereby enhancing the efficiency with which human services are delivered.

The relationship-management system 10 enables an employee of a public agency to determine whether a particular local service-provider has contracted with any other public agency for a particular service, and if so, what rates were charged by that service provider. In one practice of the invention, the employee logs onto the relationship-management system 10 by entering a username and password. After authenticating the username and password, the relationship-management system 10 displays the employee's personal home page.

On the personal home page, the employee selects a command, from a menu, button or other interface, to view a profile of that service provider as it currently exists within the relationship-management system 10. The service provider can be searched for by name or by any other identifier.

In response, relationship-management system 10 displays that service provider's overview page. The overview page includes a brief description of the service provider, information on services it provides, its size, location, and other basic information concerning the provider. Multiple tabs, or other selection elements, on the overview page invite the employee to examine more detailed information on the selected provider. Examples of such information include audit documents and results, license status, claim and payment history, financial statements, exceptional issues, other contracts entered into with other public agencies, both executory and completed, and program information. One of those tabs causes the relationship-management system 10 to display a page listing all public agencies with which the particular service provider has contracted, the services associated with each contract, the costs associated with those services, payment histories, and any other pertinent information.

Based on information provided by the relationship-management system 10, for example by the procurement module 34, the employee may discover that another public agency paid considerably less for those services. The employee can then contact a counterpart employee at that other public agency to determine the reason, if any, for this difference.

The relationship-management system 10 also enables employees of service providers to efficiently submit claims and to promptly correct errors in those claims. In one practice of the invention, a billing manager of a service provider launches a web browser and enters an identifier, for example a URL, associated with the relationship-management system 10. To prevent unauthorized access by the public at large, the relationship management system 10 requires a valid username and password to proceed further.

In response to receiving a valid username and password, the relationship management system displays a service-provider home page associated with the service provider corresponding to the username and password.

The service-provider home page includes several tabs, or equivalent page elements, each of which is associated with a type of transaction. Examples of transactions include submitting claims, checking claim status, changing provider profile information, and standard report generation.

In response to clicking a tab associated with submitting claims, the relationship-management system 10 displays a list of the eligible contracts for which a claim can be submitted, and a button or similar element associated with each contract.

Upon noting activation of a button associated with a particular contract, the relationship-management system 10 invites the billing manager to upload a standard file, the format and contact of which is appropriated for the particular contract. The relationship-management system 10 then provides that file to the invoice module 26 for further processing.

In some cases, there may be an error in the uploaded standard file. Exemplary errors include missing or incomplete data regarding eligibility of a client for whom the services were rendered, duplicate claims, and the like. Should there one or more errors, the invoice module 26 provides an error report listing of rejected claims and the reasons for each rejection. The relationship management system transmits the error report to the billing manager in a format that enables the billing manager to route the error report to other employees of the service provider.

In another practice of the invention, the relationship-management system 10 facilitates collaboration by employees of different public agencies. For example, suppose that several public agencies (hereafter referred to as the "interested agencies") require purchase of similar services. Any one of those agencies can create a shell document for a service contract. The content of the shell document depends in part on historical data provided by the relationship management system 10. Such historical data includes, for example, the average rate charged for such services, and the average utilization of such services over a selected period, for example the previous year.

To create a shell document, an employee of any one of the interested agencies logs into the relationship-management system 10. Once logged into the system, the employee can obtain a report showing the past year's utilization trends for this service, average rates by service provider based on geography and other factors. The employee then compares this information with funds allocated for these services and forecast utilization of this service. The employee then establishes a secure collaboration space within the relationship-management system 10 to enable collaboration among all the interested agencies, and posts the shell document in the collaboration space. The relationship-management system 10 then notifies all interested agencies.

During an ensuing collaboration period, employees of the interested agencies review and make changes to the shell document. If any of the interested agencies have issued a request-for-proposal ("RFP") the RFP, and any response thereto, are posted in the collaboration space. The relationship-management system 10 notifies all interested parties of any new postings to the collaboration space, any changes to existing postings in the collaboration space, and any messages between interested parties.

Once the shell document is complete, an employee of any one of the interested agencies can ask the relationship-management system 10 to generate a listing of all service providers that have been pre-qualified to provide such services. The completed shell document, which is now an RFP, is then posted to home pages of the qualified service providers. Designated employees of these qualified service providers will thus see the RFP upon next logging into the relationship-management system 10. In an optional feature of the invention, the relationship-management system 10 can also transmit a message to the designated employees inviting them to view the RFP and providing a deadline for responding to the RFP.

The relationship-management system 10 also facilitates renewal of a service provider's expiring contract. In another practice of the invention, the relationship-management system 10 notifies a service-provider's designated employee of an imminent expiration of an existing contract. Upon receiving such notification, the designated employee logs onto the relationship-management system 10 to view the service provider's home page. The home page includes options for updating demographic information, viewing status information of all contracts between that service provider and the public agencies, and similar information. The home page, or a page accessible therefrom, includes a notice indicating that a contract is about to expire.

The designated employee then downloads appropriate forms for renewing the contract, with appropriate instructions. The designated employee also notes the time and location of an information session being held for all interested provider organizations.

Once all downloaded forms have been completed, the designated employee logs back into the relationship-management system 10, views a contract status page accessible from the service provider's home page, and clicks on a submission link for submitting the completed forms. The submission link launches a submission page that guides the designated employee through a process for uploading the completed forms.

The relationship-management system 10 creates a collaborative work area and routes the submitted forms from the service provider, as well as from any other service providers, to that work area. The relationship-management system 10 then notifies employees of one or more interested agencies that a submission is ready to be reviewed.

The collaborative work area includes a number of links, each of which leads to a page containing, or providing access to, renewal information provided by a particular service provider. Upon noting activation of a link, the relationship-management system 10 provides access to documents submitted by the renewing service provider. The relationship-management system 10 also draw attention to any outstanding auditing and/or licensing issues associated with any of the multiple contracts that the renewing service provider has with any other purchasing agency. This page also provides links to information on any such contracts, the renewing service provider's uniform financial report, and a single consolidated accounting form showing, in one location, a side-by-side line item summary of all of the financial accounts that the renewing service provider holds with any purchasing agency.

In an ensuing evaluation period, employees of interested agencies have the opportunity to log into the relationship-management system 10 and review the information in the work area. The employees complete a web-based form including comments and response. The completed forms are provided to a central collection database. An employee of one of the interested agencies can then compile selected comments forward them to the designated employee of the renewing service provider for comment. Any responses to those comments are then uploaded by the designated employee of the renewing service provider in the manner described above. These responses are then posted to the collaborative work area, also as described above.

A collaborative exchange of information having one or more cycles as described above can be continued until all interested public agencies are satisfied that the conditions for renewal have been met. When this is the case, the relationship management system 10 transmits an appropriate message to the designated employee of the renewing service provider.

The relationship-management system 10 also enables a service provider to view the status of all its relationships with all purchasing agencies and to submit inquiries regarding any outstanding claims. In this practice of the invention, a designated employee of a service provider logs into the relationship-management system 10 by entering a username and a password. The relationship-management system displays, to the designated employee, a home page associated with that service provider.

The designated employee then navigates to a provider profile page from which demographic information concerning the service provider can be changed. The provider profile page includes links to additional pages showing different views of the service provider's relationships with the public agencies. The designated employee then clicks on an appropriate tab to see a summary of current claims and payment activity. This causes the relationship-management system 10 to display a page for displaying all billing-related transactions. The page contains options to filter bills by time intervals or by the type of services provided.

In response to an inquiry by the designated employee, the relationship-management system 10 returns a report that shows, by program type, all of the claims submitted by service provider and, for each such claim, its status. The designated employee can the click on a tab labeled "Transaction Inquiry" to open an inquire page.

The inquiry page opens a standard form having options for selecting the nature of the inquiry. After completing the form, the designated employee causes the relationship management system to route the completed form to the appropriate agencies and to the appropriate parties within those agencies.

In response, the appropriate parties within the agencies can collaborate to transmit a message to the designated employee of the service provider to provide directions on how to resolve any outstanding issues related to processing the claims.

The central server 16 shown in FIG. 2 is a logical server. Hence, there is no requirement that the individual modules shown in FIG. 2 execute on the same physical server. The central server 16 can include separate physical servers in data communication with each other and configured to operate as if they were a single logical server.

An agency that participates in the relationship-management system 10 provides historical data about various services purchased from various service-providers for incorporation into the utilization database 30 of the relationship management system 10. An agency, or a state government or other entity associated with the agencies, can identify opportunities to benefit (e.g., to obtain cost savings) from the relationship management system 10 by identifying service-providers that provide services to more than one agency.

Figure 3:
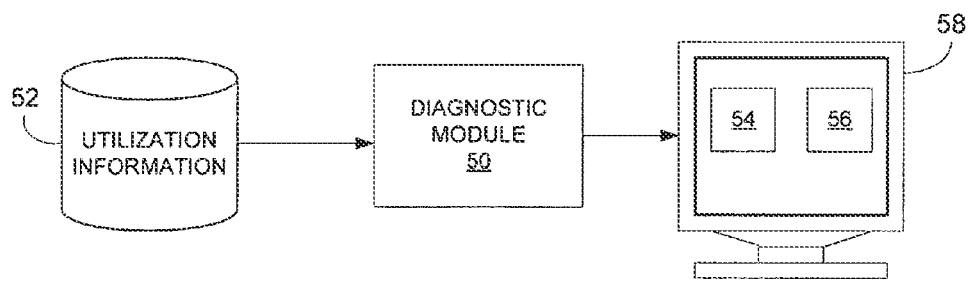
FIG. 3 is a diagnostic module for analyzing utilization information.

Referring to FIG. 3, a diagnostic module 50 identifies a particular group of service-providers that can be incorporated into the utilization database 30 to provide the most value to the agencies. The diagnostic module 50 accepts "utilization information" 52 from the agencies (e.g., information describing existing contracts and/or previous purchases). The utilization information characterizes costs associated with services purchased by the respective agencies from various service-providers. Based on the utilization information 52, the diagnostic module 50 generates "overlap statistics" characterizing services purchased by different agencies from a common service-provider. The diagnostic module 50 generates summary information 54 and a series of graphical representations 56 of the overlap statistics (e.g., including tables or Venn diagrams), as described in more detail below. The graphical representations 56 can be displayed on a computer screen 58 or printed to enable a user to easily visualize the results of the analysis of the diagnostic module 50 and to select service-providers for incorporation into the utilization database 30 based on those results.

Figure 4:
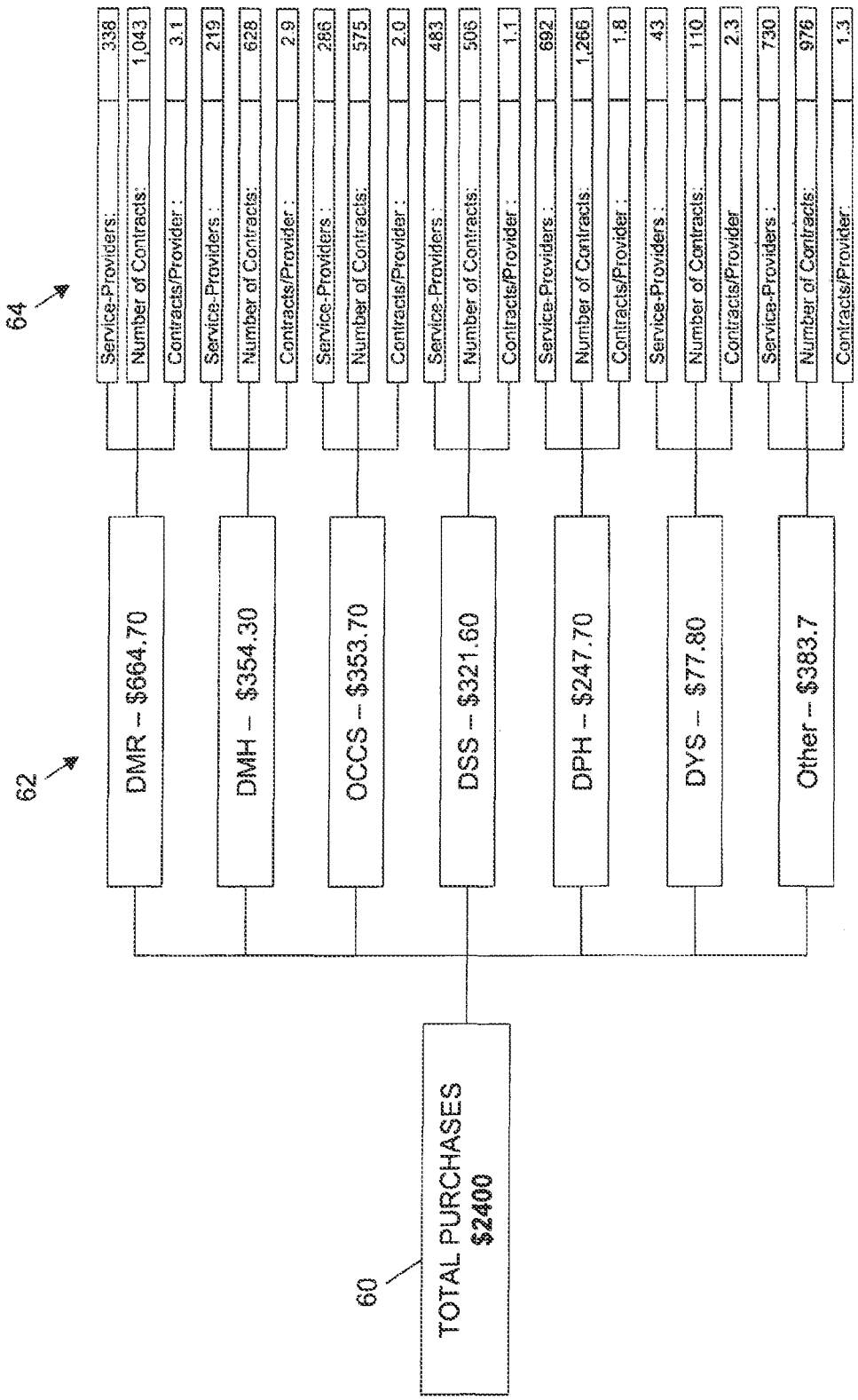
FIG. 4 is a chart summarizing purchasing patterns of a group of agencies.

Referring to FIG. 4, one example of summary information 54 includes a summary of purchasing patterns of a group of agencies associated with a state government health and human services department. A box 60 includes the total dollar amount ($2,400,000) of purchases made by all of the agencies in a time period (e.g., one year). (In FIGS. 4-11, dollar amounts are shown in units of millions of dollars.) A first column 62 lists agencies ranked according to the dollar amount of purchases made by the respective agency for the time period. The top six agencies (DMR, DMH, OCCS, DPH, and DYS) are listed separately; the rest of the agencies are aggregated into an "Other" category. A second column 64 lists a total number of service-providers, a total number of contracts, and an average number of contracts per service-provider for each agency listed in the first column 62.

Figure 5A:
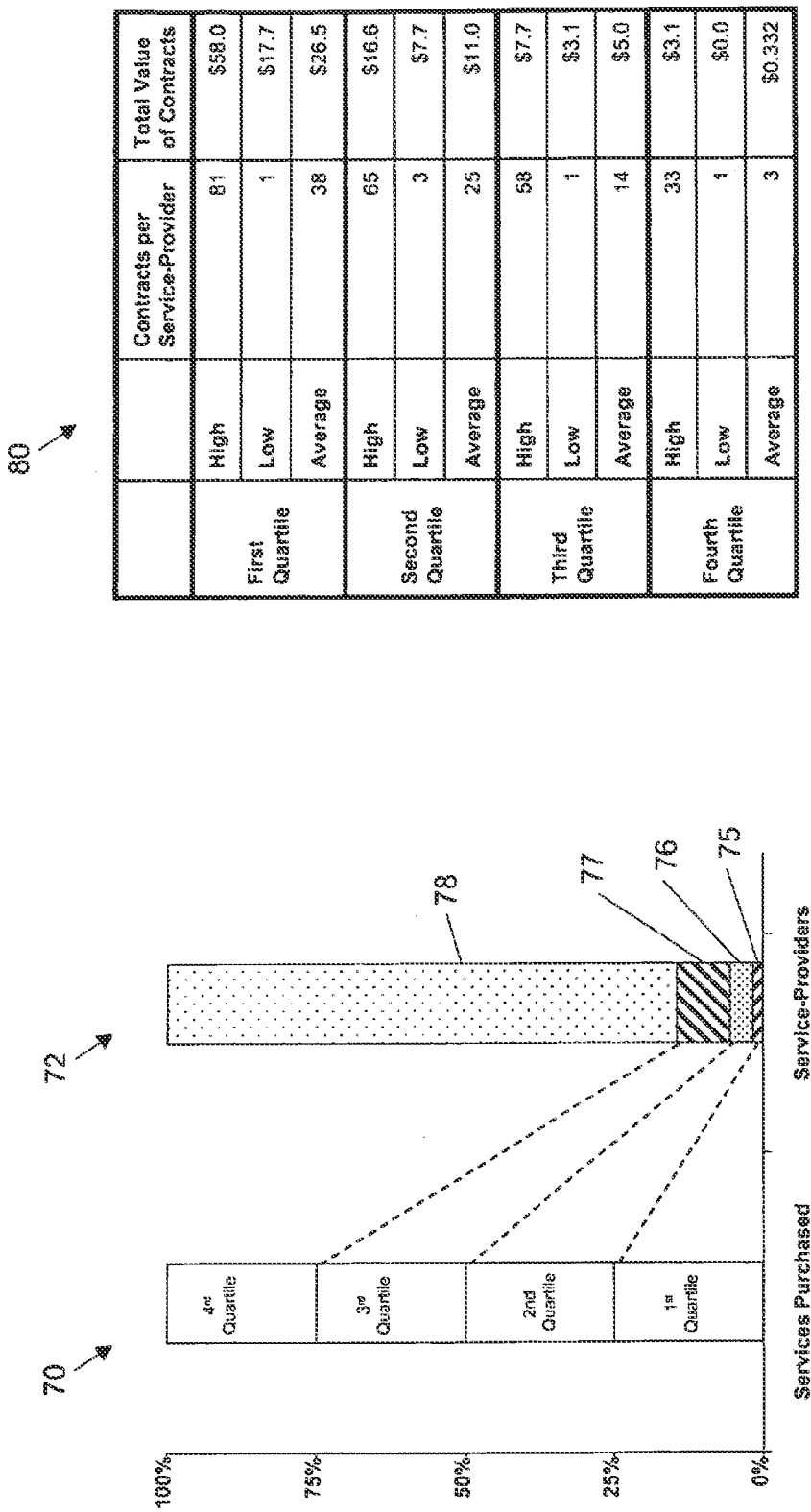
FIGS. 5A and 5B are examples of summary information including a quartile segmentation of service-providers.
Figure 5B:
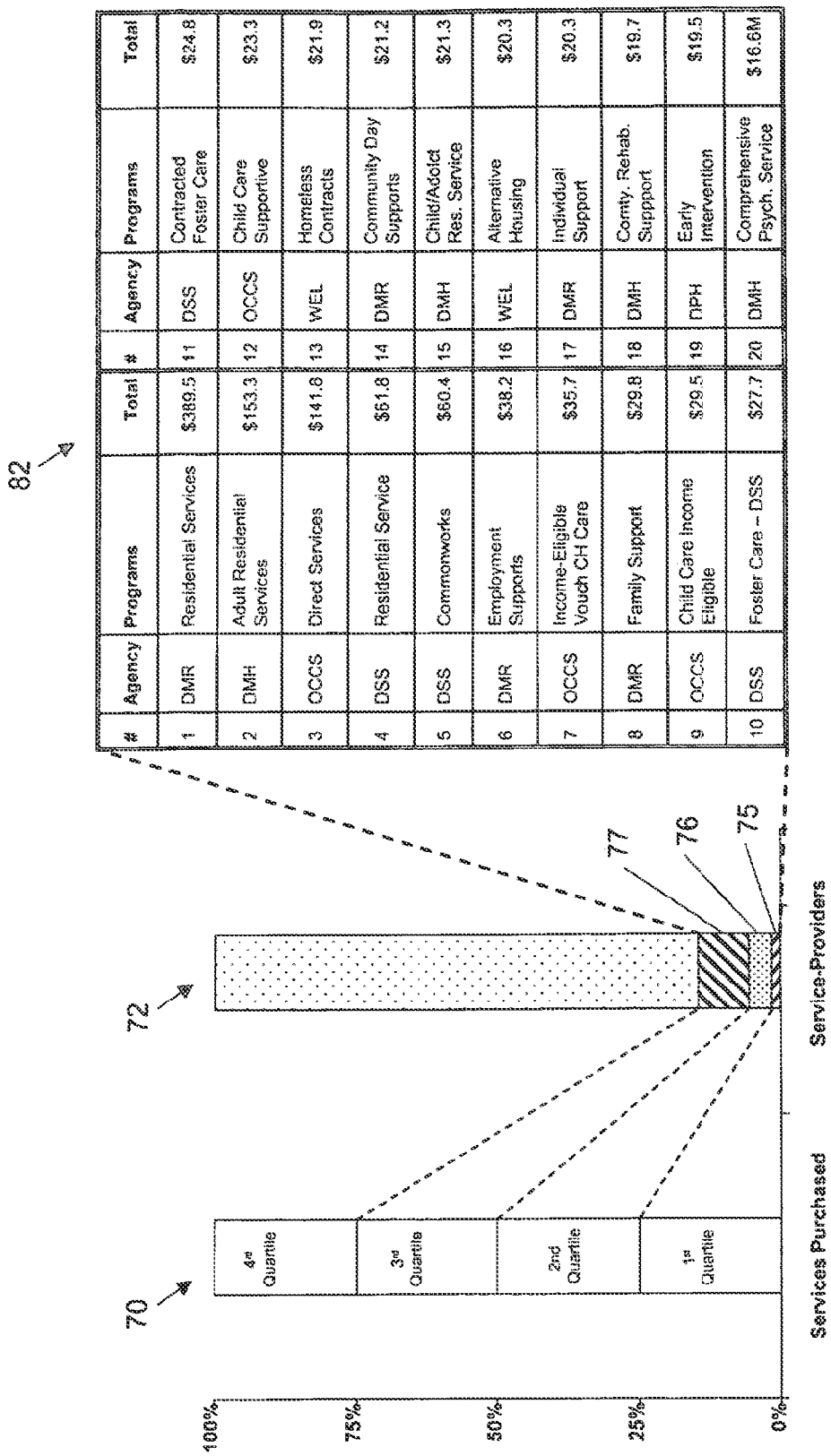

Referring to FIGS. 5A and 5B, another example of summary information 54 includes a quartile segmentation of service-providers according to the value of services purchased from a service-provider during the time period (e.g., based on contracts obtained by the service-provider). A first bar graph 70 represents the four quartiles of the total value of services purchased by all agencies (with 100%=$2,400,000). A second bar graph 72 represents the percentage of service-providers corresponding to the four quartiles of purchased services. For example, the first segment 75, corresponding to the first quartile, represents 23 out of 2003 service-providers (approximately 1%). The second segment 76, corresponding to the second quartile, represents 54 out of 2003 service-providers (approximately 3%). The third segment 77, corresponding to the third quartile, represents 120 out of 2003 service-providers (approximately 6%). The fourth segment 78, corresponding to the fourth quartile, represents 1806 out of 2003 service-providers (approximately 90%).

A contracts table 80, shown in FIG. 5A, provides quantities characterizing the contracts for services from the service-providers, by quartiles. The contracts table 80 includes the high, low, and average of the total value of contracts during the time period and of the number of contracts per service provider. In this example, the low total value of contracts during the time period for the fourth quartile is $0 for a service-provider that has a contract with one or more of the agencies, but does not have any actual purchases during the time period.

A services table 82, as shown in FIG. 5B, provides a list of service areas (or "programs") provided by the top 197 service-providers during the time period (representing the top three quartiles, or 75%, of the value of services purchased during the time period). The services table 82 is sorted in order of decreasing value for the respective programs. The services table 82 also includes the agency contracting services from each program.

FIGS. 6A and 6B show exemplary first and second tables 100A and 100B that may be included in the graphical representations 56 of the overlap statistics. In these examples, the first and second tables 100A and 100B include an entry for each of the possible pairings of the top six agencies, according to the dollar amount of purchases made by the respective agency, as listed in the first column 62 (FIG. 4). To display the information in more compact manner, the pairings of the six agencies are represented in cells of a 5×5 table. One of the six agencies is omitted from the column headings, and a different one of the agencies is omitted from the row headings. By arranging the column and row headings as shown in FIGS. 6A and 6B, the 15 unique pairings of the six agencies appear in an "upper triangular" portion of the table. In other embodiments, a table can include all or a subset of the $(N^2-N)/2$ pairings for the top N agencies, similarly displayed in a $(N-1)\times(N-1)$ table.

The first table 100A includes, in a cell corresponding to two agencies, the value of services purchased by the two agencies from a common service-provider. For example, the cell corresponding to the agencies DMH and DMR indicates that together, these two agencies spent $514 million on services purchased from the same service-providers. This cell also includes the quantity as a percentage of the total spending of the two agencies during the time period. For example, the cell corresponding to the agencies DMH and DMR indicates that together, these two agencies spent 50% of their total spending on services purchased from the same service-providers. The second table 100B includes, in a cell corresponding to two agencies, the number of service-providers contracted by both agencies. For example, the cell corresponding to the agencies DMH and DMR indicates that both agencies DMH and DMR purchased services from 66 common service-providers during the time period.

Figure 7:
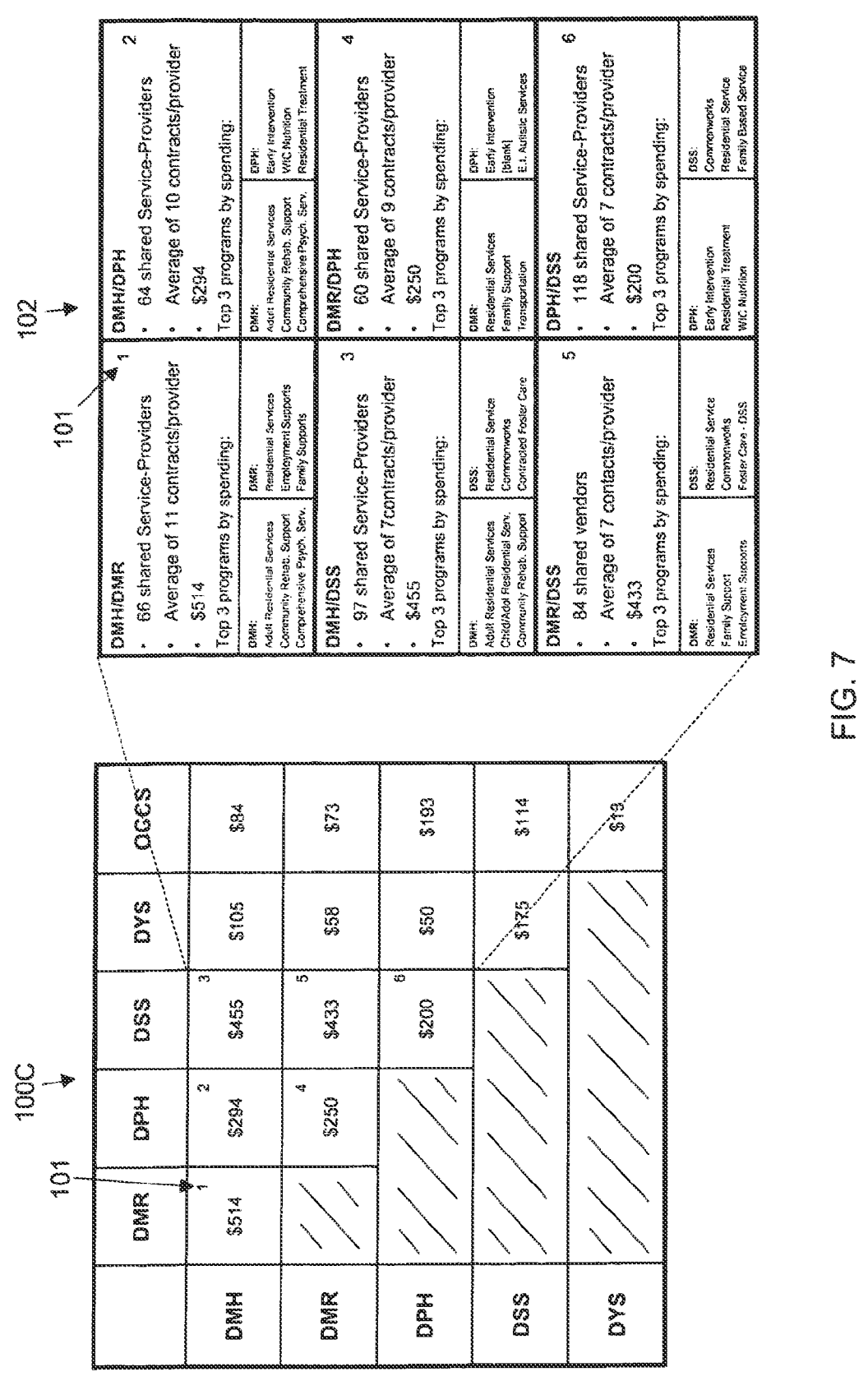

Referring to FIG. 7, a third table 100C includes cells containing the value of services purchased by the two agencies from a common service-provider (as in the first table 100A) and a numerical label 101 for the six cells having the highest dollar amount. A summary chart 102 includes, for each of the pairs of agencies represented by the six cells, a list of additional statistics such as the number of service-providers contracted by both agencies, an average number of contracts per service-provider, and lists of the "top" (i.e., most expensive) programs purchased by each agency of the pair of agencies.

Figure 8:
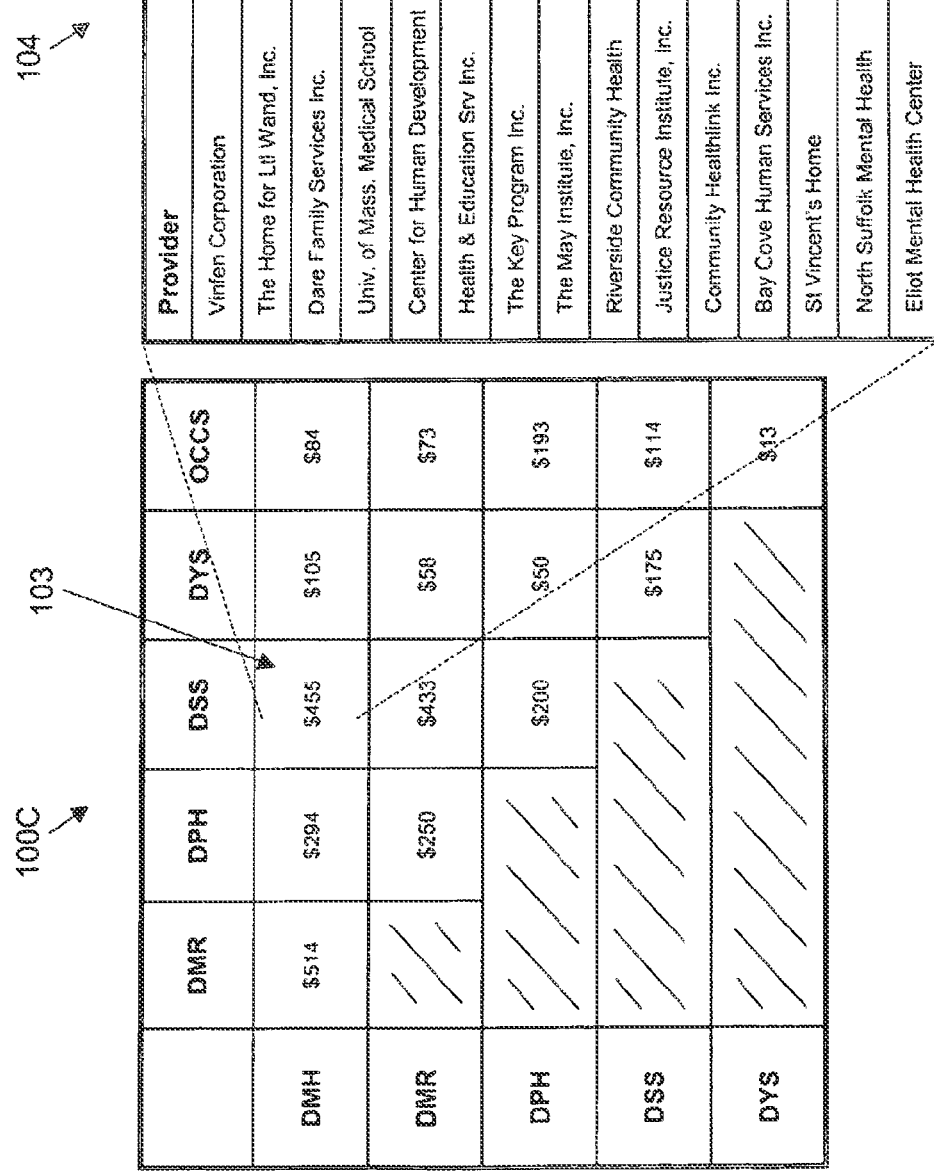

Referring to FIG. 8, associated with a cell 103 corresponding to the pair of agencies DMH and DSS is a table 104 listing the top fifteen service-providers from whom services were purchased by both DMH and DSS. The service-providers are ranked according to the total dollar amounts spent by DMH and DMS combined. The table 104 also lists these total dollar amounts along with the individual amounts spent by DMH and DSS, respectively.

Referring to FIG. 9, associated with the cell 103 corresponding to the pair of agencies DMH and DSS is a table 106 listing the top ten programs purchased by DMH from 97 "shared" service-providers (i.e., service-providers from whom services were purchased by both DMH and DSS), and the top ten programs purchased by DSS from these 97 shared service-providers.

Figure 10:
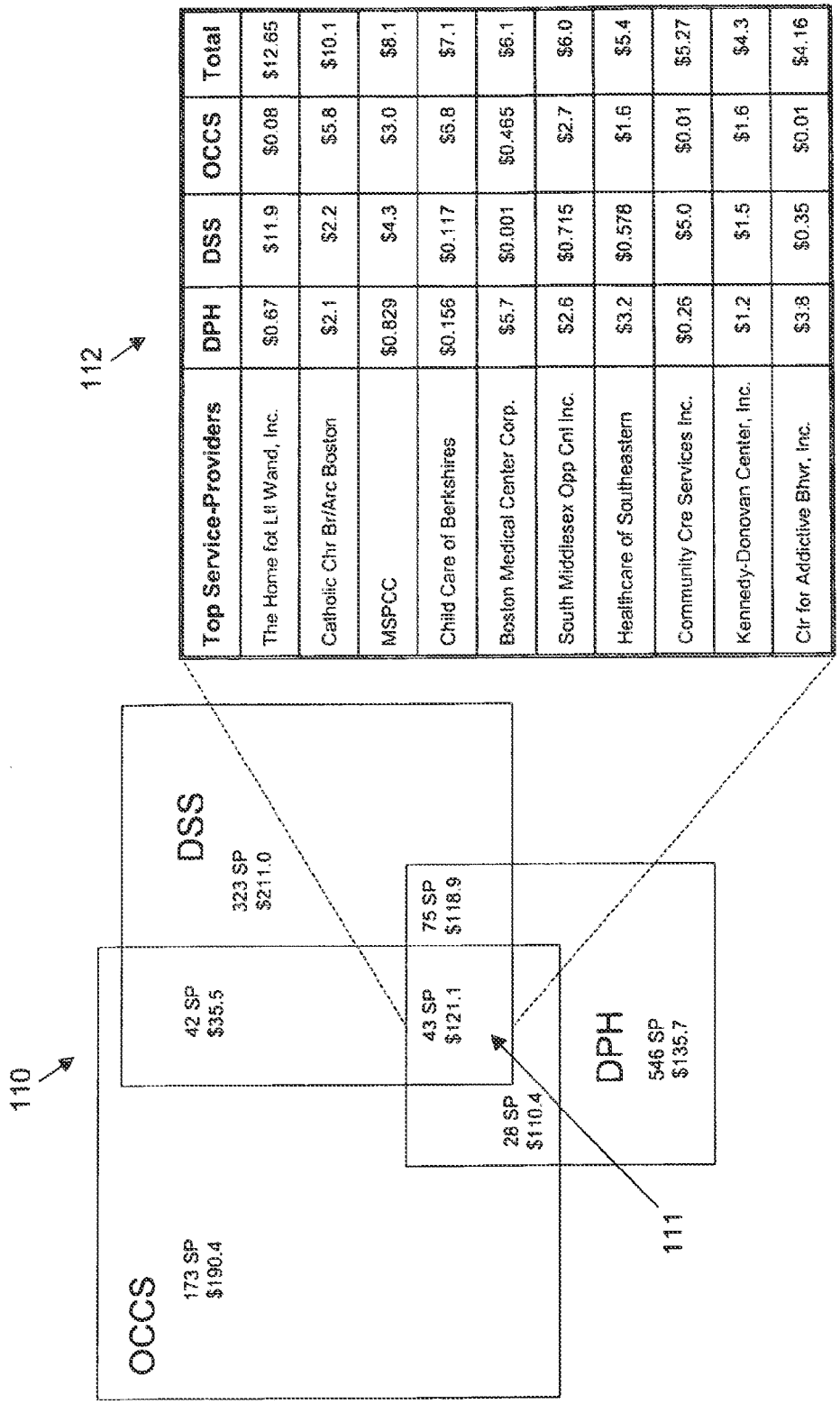
Figure 11:
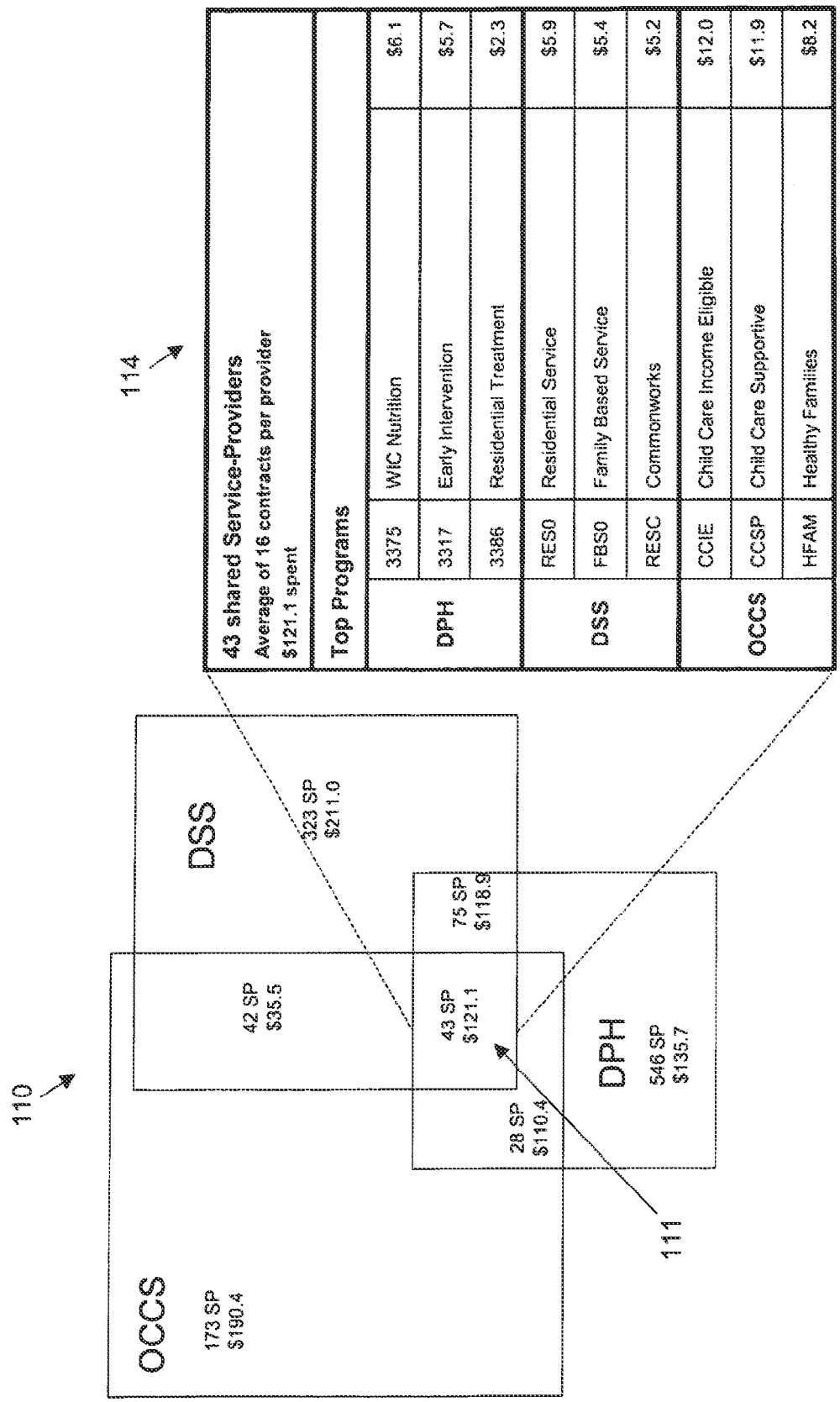

Referring to FIGS. 10 and 11, a Venn diagram 110 is an example of a graphical representation 56 of overlap statistics for three different agencies: OCCS, DSS, and DPH. Each agency is represented by a shape (a square in this example) that identifies the respective agency. An intersection between two shapes includes a number of service-providers shared by the two agencies associated with the two intersecting shapes but excluding any service-providers providing services to the remaining agencies, and a total dollar amount of services purchased by only those two agencies from those service-providers. The intersection of all three shapes includes the number of service-providers shared by all three agencies and the total dollar amount of services purchased by all three agencies from those service-providers. The portion of a shape not overlapping the other shapes includes the number of service-providers providing services only to that agency and the dollar amount spent by the agency for those services. Thus, in this example, the three numbers of service-providers included in a shape can be added together to yield the total number of service-providers for the agency associated with that shape, but the sum of the dollar amounts do not yield the total amount spent by that agency.

A table 112 (FIG. 10) associated with the intersection 111 of all three shapes lists the top ten service-providers from whom services were purchased by the agencies corresponding to those shapes, i.e., OCCS, DSS, and DPH. The service-providers are ranked according to the total dollar amounts spent by OCCS, DSS, and DPH combined. The table 112 also lists these total dollar amounts along with the individual amounts spent by OCCS, DSS, and DPH respectively.

Another table 114 (FIG. 11) associated with the intersection 111 of all three agencies includes three lists, each one of which corresponds to one of the three agencies. Each list shows, for its corresponding agency, the three programs on which that agency has spent the most money (from 43 shared service-providers).

Although the invention has been described above in the context of one embodiment, this is but one of many embodiments that incorporate the principles of the invention. The foregoing description is illustrative the invention and is therefore not to be construed as limiting the scope of the invention. Rather, the scope of the invention is to be determined by the appended claims.

Having described the invention, and a preferred embodiment thereof, what we claim as new and secured by Letters Patent is:

1. A computer-implemented method comprising:
   accepting utilization information characterizing aspects of contracts entered into by each of a plurality of independent agencies with one or more independent service-providers included in a plurality of independent service-providers;
   based on the utilization information, identifying instances in which a first independent agency included in the plurality of independent agencies and a second independent agency included in the plurality of independent agencies have each entered into a contract with a common service-provider included in the plurality of independent service-providers, the first independent agency being different than the second independent agency;

based on the identified instances in which the first independent agency and the second independent agency have each entered into a contract with the common service-provider, calculating, using at least one computer that includes a processor and a portion of the utilization information that specifies monetary value of contracts associated with the identified instances, overlap statistics characterizing a degree, with respect to the monetary value, to which interactions of the first independent agency and at least one common service-provider overlap with interactions of the second independent agency and the at least one common service-provider; and generating a graphical representation of the overlap statistics that indicates the degree, with respect to the monetary value, to which interactions of the first independent agency and the at least one common service-provider overlap with interactions of the second independent agency and the at least one common service-provider, wherein calculating the overlap statistics comprises calculating, using a portion of the utilization information that specifies monetary value of contracts associated with the identified instances, overlap statistics characterizing a degree, with respect to the monetary value, to which the first independent agency and the second independent agency interact with at least one common service-provider relative to total interactions of the first independent agency and the second independent agency with all of the plurality of service-providers.

2. The method of claim 1, wherein generating the graphical representation comprises:

rendering a first graphical element identifying the first independent agency of the plurality of agencies;

rendering a second graphical element identifying the second independent agency of the plurality of agencies; and rendering an intersection element corresponding to the first graphical element and the second graphical element, the intersection element visually indicating the degree, with respect to the monetary value, to which interactions of the first independent agency and the at least one common service-provider overlap with interactions of the second independent agency and the at least one common service-provider.

3. The method of claim 2, wherein the first graphical element comprises a heading of a row, the second graphical element comprises a heading of a column, and the intersection element comprises a cell corresponding to said row and said column.

4. The method of claim 3, wherein:

identifying instances in which the first independent agency and the second independent agency have each entered into a contract with a common service-provider comprises identifying instances in which the first independent agency, the second independent agency, and a third independent agency have each entered into a contract with a common service-provider, the third independent agency being different than the first independent agency and the second independent agency;

calculating overlap statistics characterizing the degree, with respect to the monetary value, to which interactions of the first independent agency and at least one common service-provider overlap with interactions of the second independent agency and the at least one common service-provider comprises calculating overlap statistics characterizing a degree, with respect to the monetary value, to which interactions of the first independent agency and at least one common service-provider, interactions of the second independent agency and the at least one common service-provider, and interactions of the third independent agency and the at least one common service-provider overlap;

generating the graphical representation further comprises rendering a third graphical element identifying the third independent agency of the plurality of agencies, the third graphical element comprising a third shape; and rendering the intersection element comprises rendering an intersection element that corresponds to an intersection of the first shape and the third shape and an intersection of the second shape and the third shape.

5. The method of claim 2, further comprising determining a list including service-providers from whom services were purchased by both the first agency and the second agency, wherein generating the graphical representation further comprises:

displaying the determined list including service-providers from whom services were purchased by both the first agency and the second agency in association with the intersection element.

6. The method of claim 2, further comprising determining a list including types of services purchased by the first agency from a service-provider from whom services were purchased by both the first agency and the second agency, wherein generating the graphical representation further comprises:

displaying the determined list including types of services purchased by the first agency from a service-provider from whom services were purchased by both the first agency and the second agency in association with the intersection element.

7. The method of claim 2 wherein:

calculating overlap statistics characterizing the degree to which interactions of the first independent agency and at least one common service-provider overlap with interactions of the second independent agency and the at least one common service-provider comprises:

computing a total value of services collectively purchased from the at least one common service-provider by the first independent agency and the second independent agency; and computing a percentage of the total value of services collectively purchased from the at least one common service provider by the first independent agency and the second independent agency with respect to a total value of services collectively purchased from all service-providers by the first independent agency and the second independent agency; and rendering the intersection element comprises rendering an intersection element that displays the total value of services collectively purchased from the at least one common service-provider by the first independent agency and the second independent agency and that displays the percentage of the total value of services collectively purchased from the at least one common service provider by the first independent agency and the second independent agency with respect to the total value of services collectively purchased from all service-providers by the first independent agency and the second independent agency.

8. The method of claim 2 wherein:

calculating overlap statistics characterizing the degree to which interactions of the first independent agency and at least one common service-provider overlap with interactions of the second independent agency and the at least one common service-provider comprises computing a number of common service-providers that provide services to both the first independent agency and the second independent agency; and rendering the intersection element comprises rendering an intersection element that displays the number of common service-providers that provide services to both the first independent agency and the second independent agency.

9. The method of claim 1 wherein calculating the overlap statistics comprises calculating overlap statistics for each of multiple pairs of independent agencies, further comprising:
based on the overlap statistics, identifying a subset of the multiple pairs for which a degree of overlap between interactions of agencies included in a pair with common service-providers is highest, the subset of the multiple pairs including a pre-determined threshold number of pairs;
wherein generating the graphical representation of the overlap statistics comprises:
displaying a table that includes at least one overlap statistic for each of the multiple pairs of independent agencies;
labeling, in the table, the identified subset of the multiple pairs for which the degree of overlap between interactions of agencies included in a pair with common service-providers is highest; and
displaying additional overlap statistics for each of the multiple pairs included in the identified subset.

10. The method of claim 9 wherein:
displaying the table that includes at least one overlap statistic for each of the multiple pairs of independent agencies comprises displaying a table that includes, for each of the multiple pairs of independent agencies, a total value of services collectively purchased from common service-providers by the agencies included in the corresponding pair; and
displaying additional overlap statistics for each of the multiple pairs included in the identified subset comprises:
displaying, for each of the multiple pairs included in the identified subset, a number of common service-providers contracted by both of the agencies included in the corresponding pair;
displaying, for each of the multiple pairs included in the identified subset, an average number of contracts per service-provider entered into by the agencies included in the corresponding pair; and
displaying, for each of the multiple pairs included in the identified subset, a list of a threshold number of programs for each of the agencies included in the corresponding pair, the threshold number of programs being a threshold number of programs that have the highest contribution to the value of services purchased from common service-providers.

11. The method of claim 1 wherein:
calculating the overlap statistics comprises calculating, for each of multiple pairs of independent agencies, a total value of services collectively purchased from common service-providers by the agencies included in the corresponding pair;
wherein generating the graphical representation of the overlap statistics comprises:
displaying a table that includes, for each of the multiple pairs of independent agencies, the total value of services collectively purchased from common service-providers by the agencies included in the corresponding pair; and displaying, for at least one of the multiple pairs of independent agencies, a listing of common service-providers and a total value of services purchased from each of the common service-providers included in the list by each of the agencies included in the corresponding pair.

12. The method of claim 1 wherein:
calculating overlap statistics characterizing the degree to which interactions of the first independent agency and at least one common service-provider overlap with interactions of the second independent agency and the at least one common service-provider comprises calculating overlap statistics characterizing a degree to which interactions of the first independent agency and multiple common service-providers, interactions of the second independent agency and the multiple common service-providers, and interactions of the third independent agency and the multiple common service-providers overlap; and
generating the graphical representation of the overlap statistics comprises generating a venn diagram that includes a first shape corresponding to the first independent agency, a second shape corresponding to the second independent agency, and a third shape corresponding to the third independent agency, the first shape, the second shape, and the third shape overlapping within the venn diagram to indicate a first degree to which interactions of the first independent agency, the second independent agency, and the third independent agency with the multiple common service-providers overlap, a second degree to which interactions of the first independent agency and the second independent agency with the multiple common service-providers overlap, a third degree to which interactions of the first independent agency and the third independent agency with the multiple common service-providers overlap, and a fourth degree to which interactions of the second independent agency and the third independent agency with the multiple common service-providers overlap.

13. The method of claim 12 wherein:
the second degree to which interactions of the first independent agency and the second independent agency with the multiple common service-providers overlap comprises a second degree to which interactions of the first independent agency and the second independent agency with the multiple common service-providers overlap, but do not overlap with interactions of the third independent agency;
the third degree to which interactions of the first independent agency and the third independent agency with the multiple common service-providers overlap comprises a third degree to which interactions of the first independent agency and the third independent agency with the multiple common service-providers overlap, but do not overlap with interactions of the second independent agency, and
the fourth degree to which interactions of the second independent agency and the third independent agency with the multiple common service-providers overlap comprises a fourth degree to which interactions of the second independent agency and the third independent agency with the multiple common service-providers overlap, but do not overlap with interactions of the first independent agency.

14. The method of claim 12 wherein generating the venn diagram comprises:

generating a first overlap region that relates to the overlap statistics corresponding the multiple common service-providers that interact with each of the first independent agency, the second independent agency, and the third independent agency;

generating a second overlap region that relates to the overlap statistics corresponding the multiple common service-providers that interact with each of the first independent agency and the second independent agency, but do not interact with the third independent agency;

generating a third overlap region that relates to the overlap statistics corresponding the multiple common service-providers that interact with each of the first independent agency and the third independent agency, but do not interact with the second independent agency; and generating a fourth overlap region that relates to the overlap statistics corresponding the multiple common service-providers that interact with each of the second independent agency and the third independent agency, but do not interact with the first independent agency.

15. The method of claim 14 wherein:

generating the first overlap region comprises displaying, in the first overlap region, a total value of services collectively purchased from the multiple common service-providers providing services to each of the first independent agency, the second independent agency, and the third independent agency and a total number of the multiple common service-providers providing services to each of the first independent agency, the second independent agency, and the third independent agency;

generating the second overlap region comprises displaying, in the second overlap region, a total value of services collectively purchased from the multiple common service-providers providing services to the first independent agency and the second independent agency, but not to the third independent agency and a total number of the multiple common service-providers providing services to the first independent agency and the second independent agency, but not to the third independent agency;

generating the third overlap region comprises displaying, in the third overlap region, a total value of services collectively purchased from the multiple common service-providers providing services to the first independent agency and the third independent agency, but not to the second independent agency and a total number of the multiple common service-providers providing services to the first independent agency and the third independent agency, but not to the second independent agency; and generating the fourth overlap region comprises displaying, in the fourth overlap region, a total value of services collectively purchased from the multiple common service-providers providing services to the second independent agency and the third independent agency, but not to the first independent agency and a total number of the multiple common service-providers providing services to the second independent agency and the third independent agency, but not to the first independent agency.

16. The method of claim 14 wherein generating the venn diagram further comprises:

generating a first non-overlapping region that corresponds the first independent agency and that relates to statistics for service-providers that interact with the first independent agency, but do not interact with the second independent agency and the third independent agency;

generating a second non-overlapping region that corresponds the second independent agency and that relates to statistics for service-providers that interact with the second independent agency, but do not interact with the first independent agency and the third independent agency; and generating a third non-overlapping region that corresponds the third independent agency and that relates to statistics for service-providers that interact with the third independent agency, but do not interact with the first independent agency and the second independent agency.

17. The method of claim 16 wherein:

generating the first non-overlapping region comprises displaying, in the first non-overlapping region, a total value of services collectively purchased from the service-providers that interact with the first independent agency, but do not interact with the second independent agency and the third independent agency and a total number of the service-providers that interact with the first independent agency, but do not interact with the second independent agency and the third independent agency;

generating the second non-overlapping region comprises displaying, in the second non-overlapping region, a total value of services collectively purchased from the service-providers that interact with the second independent agency, but do not interact with the first independent agency and the third independent agency and a total number of the service-providers that interact with the second independent agency, but do not interact with the first independent agency and the third independent agency; and generating the third non-overlapping region comprises displaying, in the third non-overlapping region, a total value of services collectively purchased from the service-providers that interact with the third independent agency, but do not interact with the first independent agency and the second independent agency and a total number of the service-providers that interact with the third independent agency, but do not interact with the first independent agency and the second independent agency.

18. An article of manufacture, comprising a non-transitory computer medium encoded with executable instructions that, when executed by at least one processor, cause the at least one processor to perform operations comprising:

accepting utilization information characterizing aspects of contracts entered into by each of a plurality of independent agencies with one or more independent service-providers included in a plurality of independent service-providers;

based on the utilization information, identifying instances in which a first independent agency included in the plurality of independent agencies and a second independent agency included in the plurality of independent agencies have each entered into a contract with a common service-provider included in the plurality of independent service-providers, the first independent agency being different than the second independent agency;

based on the identified instances in which the first independent agency and the second independent agency have each entered into a contract with the common service-provider, calculating, using a portion of the utilization information that specifies monetary value of contracts associated with the identified instances, overlap statistics characterizing a degree, with respect to the monetary value, to which interactions of the first independent agency and at least one common service-provider overlap with interactions of the second independent agency and the at least one common service-provider; and generating a graphical representation of the overlap statistics that indicates the degree, with respect to the monetary value, to which interactions of the first independent agency and the at least one common service-provider overlap with interactions of the second independent agency and the at least one common service-provider, wherein calculating the overlap statistics comprises calculating, using a portion of the utilization information that specifies monetary value of contracts associated with the identified instances, overlap statistics characterizing a degree, with respect to the monetary value, to which the first independent agency and the second independent agency interact with at least one common service-provider relative to total interactions of the first independent agency and the second independent agency with all of the plurality of service-providers.

19. A system comprising:

at least one processor; and at least one memory, comprising a non-transitory medium, coupled to the at least one processor having stored thereon instructions which, when executed by the at least one processor, causes the at least one processor to perform operations comprising:

accepting utilization information characterizing aspects of contracts entered into by each of a plurality of independent agencies with one or more independent service-providers included in a plurality of independent service-providers;

based on the utilization information, identifying instances in which a first independent agency included in the plurality of independent agencies and a second independent agency included in the plurality of independent agencies have each entered into a contract with a common service-provider included in the plurality of independent service-providers, the first independent agency being different than the second independent agency;

based on the identified instances in which the first independent agency and the second independent agency have each entered into a contract with the common service-provider, calculating, using a portion of the utilization information that specifies monetary value of contracts associated with the identified instances, overlap statistics characterizing a degree, with respect to the monetary value, to which interactions of the first independent agency and at least one common service-provider overlap with interactions of the second independent agency and the at least one common service-provider; and generating a graphical representation of the overlap statistics that indicates the degree, with respect to the monetary value, to which interactions of the first independent agency and the at least one common service-provider overlap with interactions of the second independent agency and the at least one common service-provider, wherein calculating the overlap statistics comprises calculating, using a portion of the utilization information that specifies monetary value of contracts associated with the identified instances, overlap statistics characterizing a degree, with respect to the monetary value, to which the first independent agency and the second independent agency interact with at least one common service-provider relative to total interactions of the first independent agency and the second independent agency with all of the plurality of service-providers.

* * * * *